US010690372B2

United States Patent
Arens et al.

(10) Patent No.: US 10,690,372 B2
(45) Date of Patent: Jun. 23, 2020

(54) INTERACTIVE OCCUPANT-TRACKING FAN FOR INDOOR COMFORT AND ENERGY CONSERVATION

(71) Applicant: THE REGENTS OF THE UNIVERSITY OF CALIFORNIA, Oakland, CA (US)

(72) Inventors: Edward A. Arens, Berkeley, CA (US); Hui Zhang, Moraga, CA (US); George Anwar, El Sobrante, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 517 days.

(21) Appl. No.: 15/178,260

(22) Filed: Jun. 9, 2016

(65) Prior Publication Data

US 2016/0363341 A1   Dec. 15, 2016

Related U.S. Application Data (63) Continuation of application No. PCT/US2014/071590, filed on Dec. 19, 2014.
(Continued)

(51) Int. Cl.
*F24F 7/06* (2006.01)
*F24F 11/79* (2018.01)
(Continued)

(52) U.S. Cl.
CPC .............. *F24F 11/79* (2018.01); *F24F 7/007* (2013.01); *F24F 7/065* (2013.01); *F24F 11/30* (2018.01);
(Continued)

(58) Field of Classification Search
CPC .. F24F 11/79; F24F 11/30; F24F 13/28; F24F 7/007; F24F 2120/10
(Continued)

(56) References Cited

U.S. PATENT DOCUMENTS 5,829,066 A * 11/1998 Aibe ................... E03D 9/052
4/213
2004/0175281 A1 * 9/2004 Remington ........... F04D 25/088
417/360

(Continued)

FOREIGN PATENT DOCUMENTS

CN     203130543 U  *  8/2013
JP     2012117418 A  *  6/2012
(Continued)

OTHER PUBLICATIONS

Korean Intellectual Property Office (KIPO), International Search Report and Written Opinion, PCT/US2014/071590, dated Apr. 28, 2015, pp. 1-15, with claims searched, pp. 16-20.

*Primary Examiner* — Vivek K Shirsat
(74) *Attorney, Agent, or Firm* — O'Banion & Ritchey LLP; John P. O'Banion (57) ABSTRACT

An occupant-tracking fan apparatus is provided with a source of forced air such as a fan nozzle in a movable support with multi-axis positioning and a controller with sensors controlling the moveable support directing forced air toward a target detected by the sensors. Targeting in real-time can be through camera imaging or with an array of ultrasonic transmitters/receivers that can identify occupant shape, range and thermal profile, even when the occupant is moving. The targeting fan cools by aiming a stream of air at the occupant increasing skin convection. The apparatus can also target thermal extremes and de-stratify air temperature gradients. Settings can be individualized by remote control, RFID tag or even prescribed gestures interpreted by the
(Continued)

camera and controller. The apparatus may be part of a building wide system with a central controller that monitors sensors, controls each fan and the building HVAC systems.

18 Claims, 7 Drawing Sheets

Related U.S. Application Data

(60) Provisional application No. 61/919,706, filed on Dec. 21, 2013.

(51) Int. Cl.
| | | |
|---|---|---|
| *F24F 11/30* | (2018.01) | |
| *F24F 11/77* | (2018.01) | |
| *F24F 7/007* | (2006.01) | |
| *F24F 13/28* | (2006.01) | |
| *F24F 13/32* | (2006.01) | |
| *F24F 11/56* | (2018.01) | |
| *F24F 120/12* | (2018.01) | |
| *F24F 120/10* | (2018.01) | |
| *F24F 120/14* | (2018.01) | |

(52) U.S. Cl.
CPC ............... *F24F 11/77* (2018.01); *F24F 13/28* (2013.01); *F24F 13/32* (2013.01); *F24F 11/56* (2018.01); *F24F 2120/10* (2018.01); *F24F 2120/12* (2018.01); *F24F 2120/14* (2018.01); *F24F 2221/14* (2013.01)

(58) Field of Classification Search
USPC ......................................................... 454/229
See application file for complete search history.

(56) References Cited

U.S. PATENT DOCUMENTS

2008/0231468 A1* 9/2008 Myllymaki ......... F24C 15/2021
340/870.17
2013/0207896 A1* 8/2013 Robinson ............ G06F 3/04815
345/158
2013/0255909 A1 10/2013 Matsumoto

FOREIGN PATENT DOCUMENTS

| KR | 10-2000-0036325 A | 7/2000 |
| KR | 20-0404352 Y1 | 12/2005 |
| KR | 10-0837354 B1 | 6/2008 |

* cited by examiner

INTERACTIVE OCCUPANT-TRACKING FAN FOR INDOOR COMFORT AND ENERGY CONSERVATION

CROSS-REFERENCE TO RELATED APPLICATIONS

This application is a 35 U.S.C. § 111(a) continuation of PCT international application number PCT/US2014/071590 filed on Dec. 19, 2014, incorporated herein by reference in its entirety, which claims priority to, and the benefit of, U.S. provisional patent application Ser. No. 61/919,706 filed on Dec. 21, 2013, incorporated herein by reference in its entirety. Priority is claimed to each of the foregoing applications.

The above-referenced PCT international application was published as PCT International Publication No. WO 2015/095753 on Dec. 21, 2013, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

BACKGROUND

1. Technical Field

This technology pertains generally to environmental conditioning systems and methods for buildings, and more particularly to an air distribution system that tracks room occupants and delivers a stream air to each of the tracked occupants and shuts down when the space is unoccupied. Directed airflow can substantially reduce the energy and economic costs of cooling and heating buildings and can greatly increase occupant comfort under both cooling and heating conditions.

2. Background Discussion

Building climate conditioning systems are designed to provide a comfortable environment to the occupants of the building. Air conditioning systems are generally used to control the climate within a building or on various floors of a budding by creating and distributing temperature modified air to the interior and withdrawing air from the interior for return to the air conditioning unit. Such climate control systems typically include a distribution system comprising an intricate network of ducts that transmit heated or cooled air from the conditioner to various locations within the building and then recycle the air back to the conditioner. Each room and hallway in a building may require a separate set of ducts to deliver and withdraw air, contributing considerably to the capitol and maintenance costs of the building.

In addition, the utilization of the enclosed spaces within a budding often varies with changing occupancy and time of day. Therefore, conventional systems for heating or cooling a building must be tailored to meet the conditioning requirements of each of the enclosed spaces. In some settings, suites of rooms or the entire interior space may be heated or cooled as a whole. For example, some office spaces are sectioned with movable partitions to create working spaces within a much larger space that has a common environment. The overall plan of these movable partitions can be designed and redesigned to meet the needs of the occupants.

However, the network of conventional ductwork in an interior space is typically fixed at particular locations upon the initial construction of the space. Rearrangement of the partitions and office enclosures requires reconstruction of the ductwork in order for the area enclosed by the partitions to be specifically conditioned. In the alternative, the ductwork remains fixed without regard for the design of the office partitions or enclosures. Therefore, the conventional systems for heating or cooling a building will remain tailored to meet the requirements of the entire space to be treated rather than the requirements of individual partitioned working spaces. In these settings, the number of office plans that can be used will be limited since the ductwork is fixed at specific locations.

Another problem with the ductwork of conventional systems used for heating or cooling a building is that the effective flow and temperature of conditioned air through the ductwork diminishes as the air travels away from the source. Consequently, some control over the environment of specific rooms or spaces is lost because the flow of air from each of the registers may not be uniform and variations in room temperature may result.

Many relatively small buildings such as single-family homes use a single heating, ventilation, and air conditioning (HVAC) unit that is controlled by a single thermostat. Other buildings, individual floors of buildings and rooms may also use thermostats to actuate the heating or cooling systems of the building for temperature control and to monitor local environmental temperatures.

Thermostats are typically installed at a location away from windows and doors that would tend to influence the temperatures sensed by the thermostat. The heating and cooling needs of the entire structure are estimated from the needs at the location of the thermostat. The heating or cooling equipment then controls the flow of conditioned air through the entire structure according to the signal of the thermostat received from a single location.

However, the environment surrounding a single thermostat may not accurately represent the heating or cooling needs throughout the entire structure. There may be other locations in the building that have heating or cooling needs that are substantially different than exist at the location of a thermostat. For example, rooms that have a large number of windows may require a greater input of heated or cooled air to maintain a desired temperature in the room. As a consequence, the occupants of some areas of the structure or zone may not be satisfied with the temperature of these areas because it will tend to deviate from the desired temperature set at the thermostat.

In some settings, control over the temperature of different locations within a building may be desirable. For example, some rooms may be occupied by an elderly person or an infant that has special temperature needs that are different from that of the rest of the building. Similarly, the temperature of rooms that are rarely occupied may not need to be maintained at the same temperature as rooms that are frequently occupied.

Accordingly, the temperature at different floors, zones or locations within a building cannot be accurately controlled by a single thermostat. Although sophisticated computer controlled heating and cooling systems are possible, uniform temperature control within floors, zones or rooms of a building may not be comfortable to individual occupants within those areas. The perception of what is a comfortable environment is often not the same between individuals with some preferring a slightly warmer work environment and others preferring a slightly cooler environment. Therefore, there is a need for a system which offers some individual control over the movement of conditioned air in a zone or area.

Cooling or heating the air in an interior environment can be a significant source of power consumption in a building. The substantial amount of energy consumed to heat or cool unoccupied rooms or to condition large interiors or individual rooms to set temperatures presents a need for devices that minimize the use of conventional air-conditioning systems and reduces the high or low environmental temperatures needed for the comfort of the building occupants.

Accordingly, there is a need for a system that provides individualized climate control for occupants of a building room, cubicle or other area that efficiently spot conditions an occupant in an area while conserving energy by reducing air-conditioner use. The present technology satisfies these needs as well as others and is an overall advancement in the art.

BRIEF SUMMARY

Current convective air conditioning systems are generally designed to create an environment with a uniform temperature determined by a thermostat and operate under the assumption that the air temperature around the thermostat is comfortable for all occupants of the building or zone. However, office occupant surveys have shown that thermal discomfort is a major cause of dissatisfaction with office or living environments, and the environment is linked with the perceived work productivity of an occupant.

Perceptions of a comfortable environment are often not the same between individual occupants. Some occupants prefer a slightly warmer or slightly cooler environment compared to others. Because of interpersonal differences in perception, at least 20% of occupants are typically uncomfortable from being too hot or too cold in any given interior environment.

Surveys have also shown that the range of ambient temperatures in which an occupant is comfortable can be enlarged by providing occupants with personal control over air temperature and air movement. Other surveys suggest that increased air movement improves the perceived air quality by an occupant even if it was with re-circulated room air.

In warm environments, for example, air movement can provide high levels of both thermal comfort and perceived air quality. Air movement can also provide comfort in warm environments in energy-efficient and cost-effective ways. Similarly, in cool environments, vertical temperature stratification in a conditioned room can be disrupted with controlled air movements thereby improving occupant perceptions.

The present technology is an interactive occupant-tracking fan apparatus and system for individualized comfort and energy conservation. Energy is conserved by the system and the inefficiencies of conditioning an entire building interior to temperatures that are comfortable in still air are avoided because (1) air motion cools occupants more energy-efficiently than lowered temperature air; (2) the occupied zone is smaller than the entire interior, and (3) conditioning individuals provides for their personal thermal needs allowing operators to widen the temperature range maintained indoors by the air-conditioning system.

Generally, the present system has one or more conditioning nodes with occupant-tracking fan devices that can operate independently or in a coordinated way with a controller. In various implementations, the node apparatus can be positioned in the ceiling (e.g., integrated in the ceiling tiles of an acoustic suspended ceiling or individually suspended), or positioned in a vertical partition (e.g., integrated in office furniture and wall partitions).

For example, the fan, occupant detector, and control system can all be integrated into a tile that fits in a standard acoustical suspended ceiling (often 2×2 feet). This tile sized platform can then be repositioned easily above workstations, lobbies, reception desks or any other place where there is a ceiling. The system can also be suspended in any void space overhead and it does not need to be integrated into a ceiling plane. The system embodiments can also be mounted vertically in walls or office partitions.

The system preferably determines whether a person is in the room within about a 10 foot radius before turning the fan or fans on. It will then track the person within the room to direct the air flow toward the occupant. Embodiments of the smart fan-nozzle cooling system can track a person in real-time and direct the flow of air towards the person's head using motion detectors, a camera, and a gimbal system. In one embodiment, the apparatus forms an aimed nozzle or shroud positioned around the blades of the fan to increase the efficiency of the fan and the distance (throw) of the air jet. To add to the comfort of the system, some embodiments allow designated occupants to be able to change the speed of the air flow.

In the summer occupant cooling mode, the system cools the occupants by aiming a stream of ambient air at the occupant and increasing convection from their skin. In cold winter months, room temperature gradients occur with colder air near the floor and occupied areas and rising warmer air near the ceiling. The system can destratify the air temperature gradient in the room by blowing warm air from the ceiling downward to displace the cooler air. In the winter destratification mode, the controller may aim the air movement to unoccupied space, and can also be used to turn the system off whenever occupants are present. In winter, any convective cooling of the occupant is undesirable, but replacing cool air in the occupied zone with warm overhead is desirable.

In another embodiment, the system includes four motion detectors, for example one on each corner of the system area. These motion detectors act as initial sensors and detect the direction from which the person is approaching and relays data to the system. The system also includes a wide angle camera for detecting occupants or points of thermal extremes within the field of view of the cameras. In one embodiment, both infrared and conventional digital cameras are used in targeting occupants or hotspots.

The fan-nozzle, with input from a camera and other sensors, is then pointed towards the sensed direction of the person and initiates a more precise visual tracking. The position of the target, as acquired by the motion detectors and camera or other sensors can then be processed and used to actuate the fan motors.

In one embodiment, the apparatus includes object recognition software that identifies the presence of occupants and their location within the active zone of the fan. An occupant tracking algorithm may be used to send control signals to turn on the fan and continuously actuate the fan-aiming-servos in the direction of the closest occupant to optimize comfort level. The occupant tracking algorithm may also turn off the fan in the absence of occupants within its active field to conserve energy. In one embodiment, a remote control (e.g., wireless) is provided to allow an occupant to control the fan level including turning it off. In another embodiment, interaction with the control functions of the device is through a set of occupant gestures that are recognized by the control sensors.

In another embodiment, the occupant sensors are a small array of postage stamp sized ultrasonic transmitters/receivers that identify the occupant shape, the occupant's range, and even prescribed gestures for the occupant that are interpreted to allow direct control of the fan speed, for example.

In another embodiment, an RFID tag worn by an occupant communicates fan settings to a node in proximity to the occupant. The air movement is specifically tailored to the designated settings of an occupant that are communicated through the RFID tag or other interactive communication with the system from an occupant.

The movement of the fan-nozzle is preferably accomplished with a dual-axis gimbal system which will allow the nozzle to yaw a full 360 degrees and pitch as much as 90 degrees from the vertical axis. This allows the nozzle to have an entire hemisphere to direct its stream of air. A motor is preferably attached to each of the gimbal axes.

In one embodiment, the apparatus includes a small (e.g., muffin-style) electric fan or air nozzle mounted in the gimbal, ball turret, or flexible mount, with electric servos tilting its directional axis in two planes, which is capable of aiming the air jet anywhere within a wide area within its field of view. In various embodiments, the gimbal has crossed pivot axes, the ball turret has one pivot axis and azimuthal rotation, and the flexible mount may be actuated without a pivot.

It can be seen that the technology may provide for individualized comfort for occupants while reducing the amount of temperature treated air needed for the building environment. The occupants can be individually conditioned to their personal requirements. With the localized movement of air provided by the system, the building does not need to be cooled quite as much. A one-degree Fahrenheit increase in indoor temperature in summer reduces a building's total annual HVAC energy by about 5%. This is very significant, because the air movement provided by the nodes permits indoor temperatures to rise 4 degrees Fahrenheit (with a 20% HVAC energy savings) while providing equal or better comfort. Unlike regular fans which provide air movement over a small fixed or oscillating area, the occupant-tracking system ensures that moving air reaches the occupant continuously even if the occupant is moving, and air movement is not being provided to empty space. The occupant detection system enables the fan to turn off automatically when the occupant is not present, saving additional energy.

Similarly, in an environment where the building air is heated, the occupant detection system enables the fan be used for destratification of the room environment by targeting the air movement to unoccupied space, and can also be used to turn the system off automatically whenever occupants are present.

According to one aspect of the technology, a system is provided that allows the environmental conditioning components of the building that are used for treating environmental air to be utilized more efficiently, allowing the building conditioning systems to be downsized or undersized.

Another aspect is to provide a tracking fan apparatus that provides comfort effects that are more immediate and localized than with conventional air conditioning systems providing for individualized occupant comfort.

A further aspect of the technology is to provide an interactive tracking fan apparatus that reduces the power required to heat or cool the air in the zone or building during normal operations while providing for individual occupant comfort.

Another aspect of the technology is to provide an apparatus that is automatically responsive to the presence and location of occupants within an area or controllable through a gesture or RFID interaction.

Further aspects of the technology described herein will be brought out in the following portions of the specification, wherein the detailed description is for the purpose of fully disclosing preferred embodiments of the technology described herein without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, an embodiment of the apparatus and methods for energy-efficient environmental air conditioning and occupant comfort system is described and depicted generally in FIG. 1 through FIG. 8. It will be appreciated that the conditioning methods may vary as to the specific steps and sequence and the apparatus may vary as to elements and configuration without departing from the basic concepts as disclosed herein. The method steps are merely exemplary of the order in which these steps may occur. The steps may occur in any order that is desired, such that it still performs the goals of the claimed technology.

Figure 1:
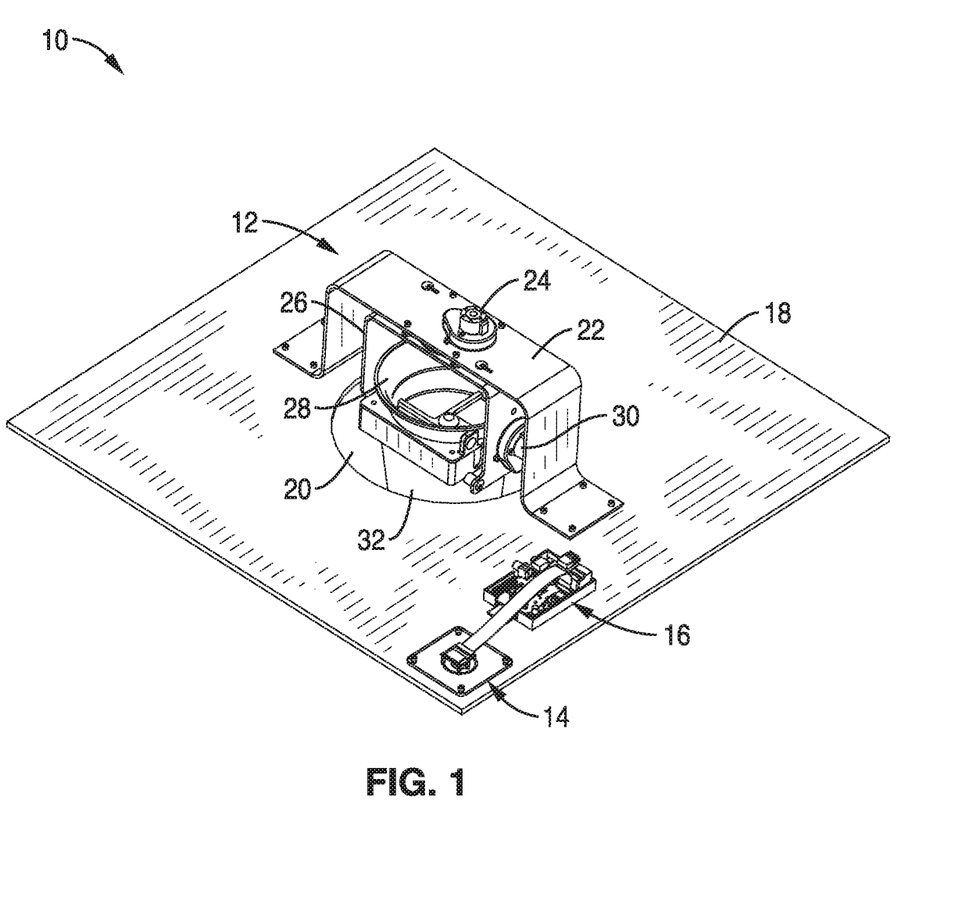
FIG. 1 is a top perspective schematic diagram of one embodiment of the apparatus with a single fan nozzle and sensor.
Figure 6:
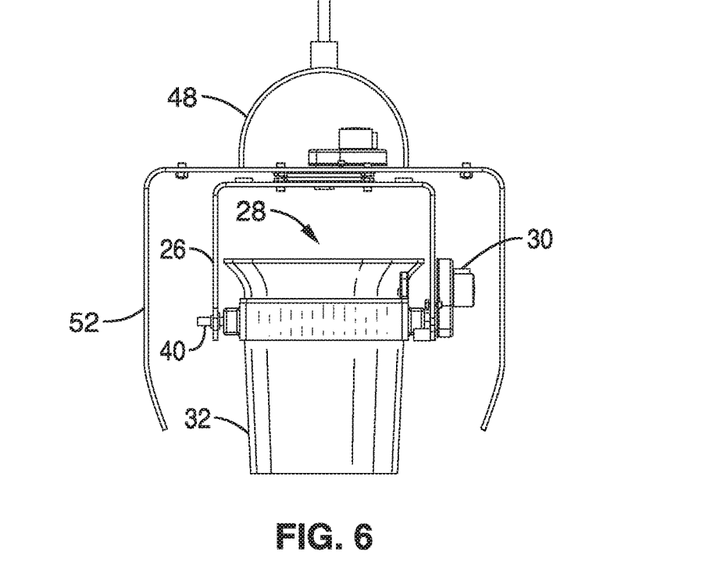
FIG. 6 is a side view of a suspended embodiment with a cut away exterior housing.
Figure 7:
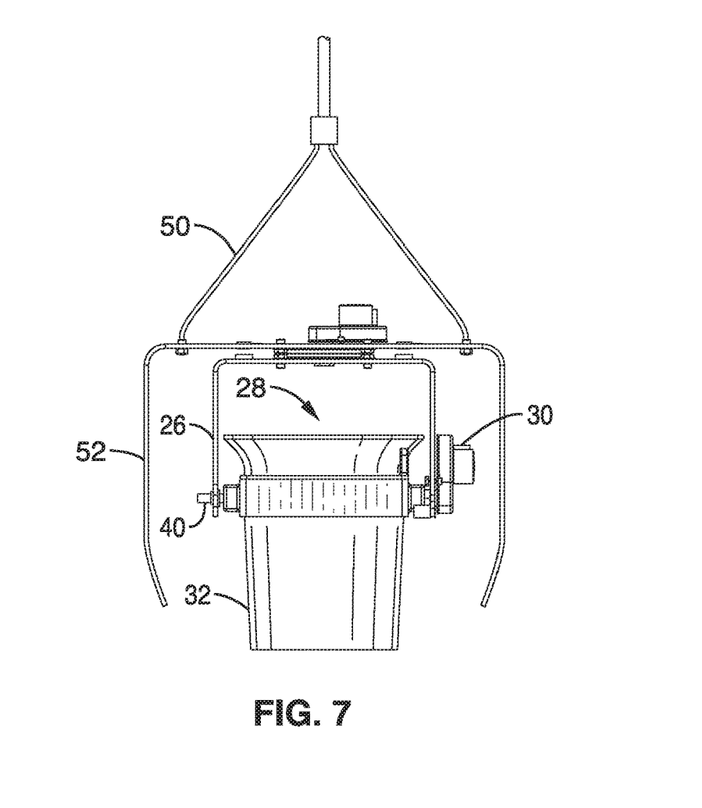
FIG. 7 is a side view of an alternative suspended embodiment with a cut away exterior housing.

Turning now to FIG. 1, one embodiment of the apparatus 10 for laser treatment is schematically shown. The apparatus 10 has generally three system elements: the blower system 12; the occupant sensor system 14 and the processing and control system 16. A ceiling tile or ceiling mounted embodiment is depicted in FIG. 1 through FIG. 5 to illustrate the system embodiments and functionality of the apparatus. However, alternative embodiments can be suspended below the ceiling by one or more rods or wires, as shown in FIG. 6 and FIG. 7, or may be mounted vertically in walls or cubicle partitions etc.

The blower system 12 has a gimbal, ball turret, or flexible mount that is configured to direct a fan or fan nozzle and a flow of air at any point around a vertical axis and providing a hemispherical zone of coverage. As seen in the exploded views of FIG. 2A and FIG. 2B, the apparatus is capable of controlling the directional axis of air nozzle 32 in both horizontal and vertical planes. The air nozzle 32 can be rotated 360 degrees around a vertical axis by rotating nozzle bracket 26 in relation to anchor bracket 22 with motor 24. The fan nozzle 32 is pivotally mounted to nozzle bracket 26 and can rotate along a horizontal axis with motor 30.

Figure 2A:
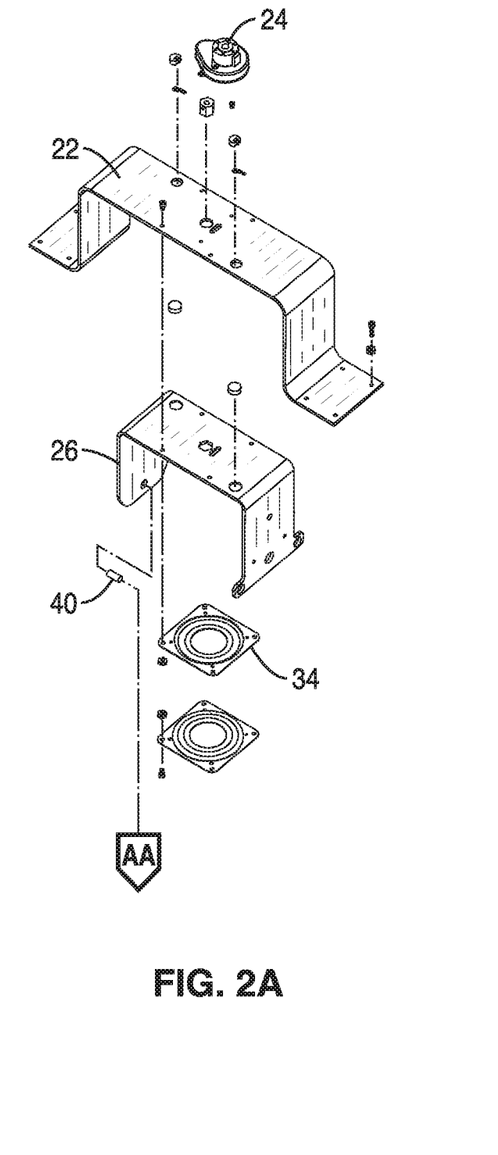
FIG. 2A is an exploded perspective view of the top outer gimbal allowing 360 degree rotation of the fan nozzle of FIG. 1 along a y-axis.
Figure 2B:
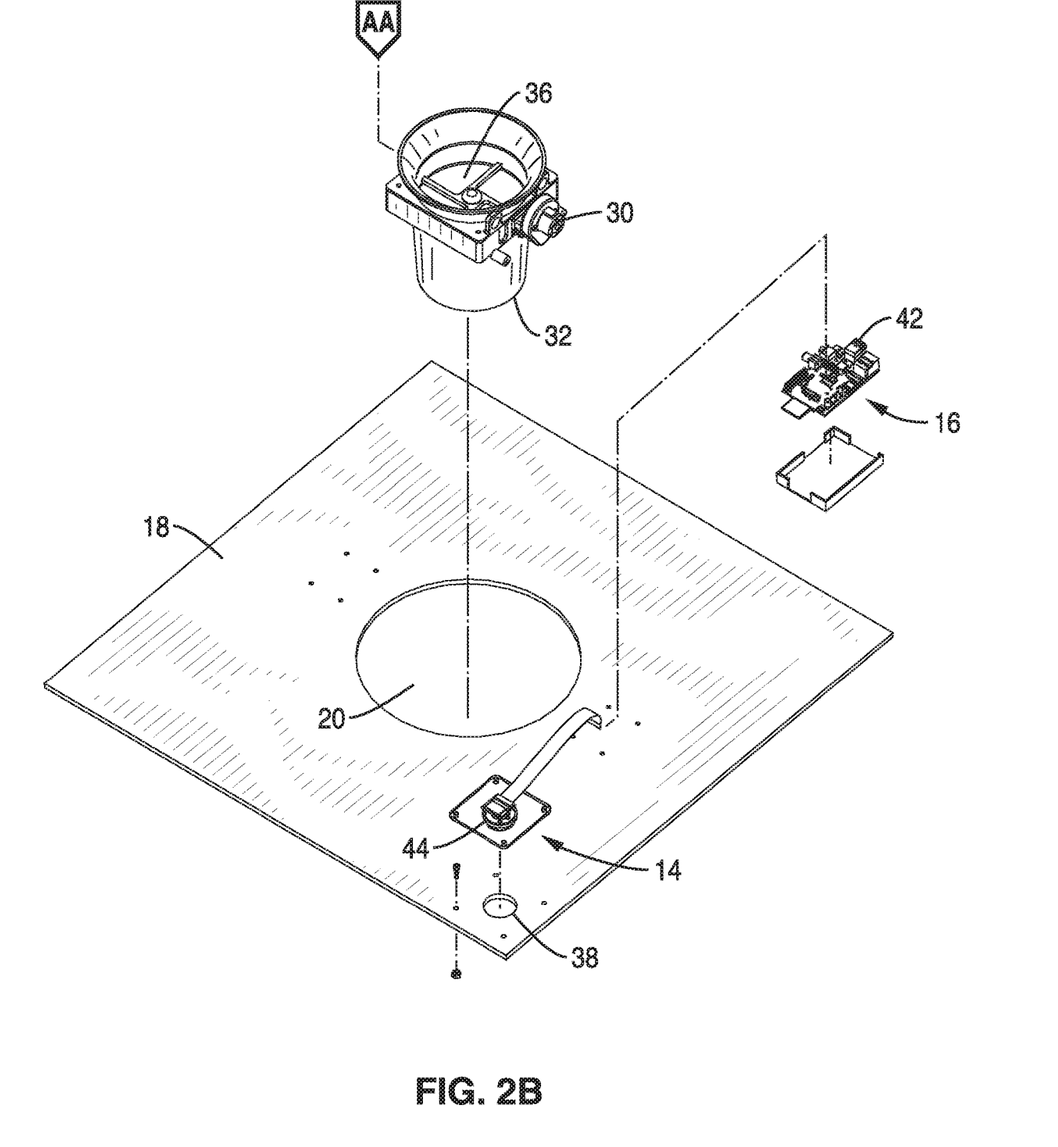
FIG. 2B is an exploded view of the fan nozzle and the inner gimbal and tracking elements.

The anchor bracket 22 is mounted to base 18 and the nozzle 32 is extended out of the plane of base 18 through opening 20 in this embodiment. In other embodiments, the anchor bracket is suspended from the ceiling or secured to the wall with cables, chains, tubes or other support structures. The weight of the nozzle bracket 26, fan 36 and fan nozzle 32 and its axial rotation by motor 24 can be supported by one or more bearings 34, as shown in FIG. 2A and FIG. 2B. Bearings 34 may also reduce friction and noise upon rotation of the nozzle bracket 26.

The fan nozzle 32 is pivotally mounted to nozzle bracket 26 by an output shaft of motor 30 and pivot pin 40. Rotation of the fan nozzle 32 with fan 36 about the horizontal axis by the motor 30 is usually directional with either a left-handed rotation or a right-handed rotation from vertical so that the total nozzle sweep can cover about 180 degrees. Accordingly, the specific direction of a stream of air from the fan nozzle 32 can be controlled by the rotation of motor 24 and motor 30.

The blower system 12 power and actuation are controlled by a processing and control system 16. Fan 36 actuation, fan speed and fan nozzle direction are controlled by a control system 12. Although the apparatus 10 and control system 16 are shown as an independent unit, the control systems of many different units can be connected, either wirelessly or by wire, and coordinated by system programming to operate as a group when more than one unit is in a particular space.

The control system 16 can have a variety of different types of controllers 42. Preferably, the controller 42 is programmable through either hardware or software to receive and process sensory signals from the occupant sensor system 14 and to control the position and speed of the fan or fans. In one embodiment, the controller 42 has a computer processor and software programming that can interface with other control devices such as tablets or cellular telephones as well as other conditioning units to allow convenient control over device settings. In another embodiment, a building system controller can connect with all of the units installed in a zone or the entire building to give zonal control over settings of the fans and building heating and cooling system. Other embodiments do not have a remote interface and settings are manually designated to the controller 42.

The sensor system 14 can be composed of one or more sensors that are mounted to base 18 through hole 38 to monitor the conditions and occupancy of a space as shown in FIG. 2B. The condition sensors in a sensor array 44 may include temperature or humidity sensors or other sensors that allow localized monitoring of the environment. However, the environment condition sensors are optional.

At least one occupancy sensor is required to provide data to allow targeting of the airstream from the nozzle to an occupant. Optionally, more than one occupancy sensor can be used in concert to facilitate targeting or to assist in gesture recognition or to determine whether the space is unoccupied.

Figure 4:
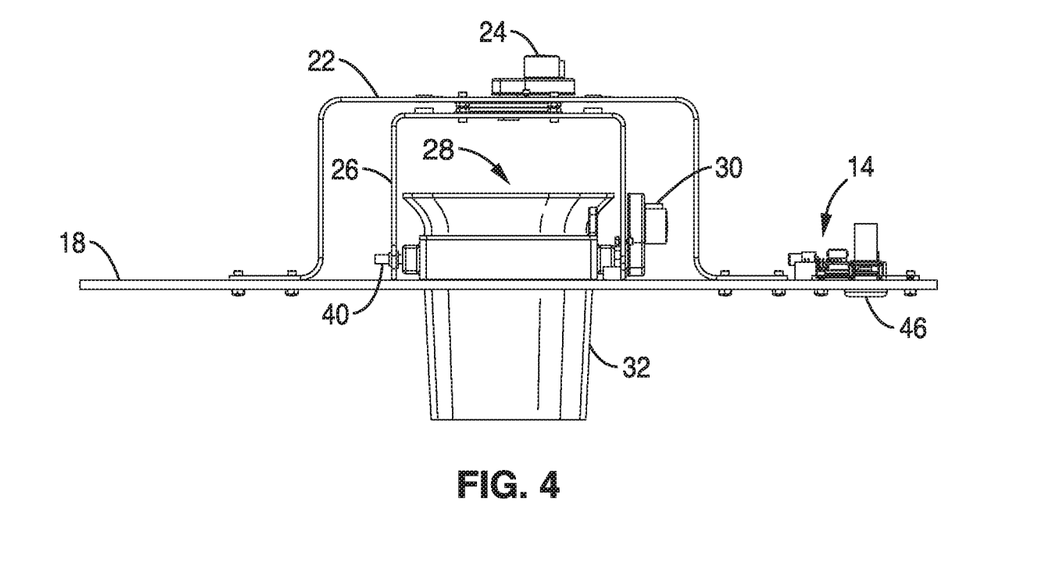
FIG. 4 is a front plan view of the apparatus.

In one embodiment, the occupancy sensor 44 is a camera with a wide angle lens 46 that has a wide field of view of the space below the apparatus (see FIG. 4). The camera sensor data can be analyzed with body recognition programming in the control system 16 so that an occupant within the camera view can be targeted and different occupants can be prioritized. In this embodiment, the camera identifies bodies rather than identities in order to avoid any privacy concerns. In another embodiment, the camera is an infrared camera that not only identifies the location of an occupant but also registers the warm or cold zones in the room or on the occupant (usually the head). Programming in the control system 16 can target specific occupants or hot or cool spots in the room for receiving the stream of air. For example, the head or back of an occupant sitting behind a desk can be targeted by the sensor system and control system as well to deliver the preferred volume of air by controlling the fan speed to optimize the environment perceived and experienced by the occupant. The air stream that is emitted from the fan nozzle 32 can also be filtered or diffused.

In another embodiment, the sensor 44 is an array of microscale ultrasonic sensors that are capable of sensing the presence, distance and hand gestures of an occupant. The three dimensional ultrasonic range finding system may also detect certain gestures that can be interpreted by the programming of the control system 16 to increase or decrease the fan speed or to turn the fan off, for example.

Another type of occupation sensor 44 that can be used in conjunction with the other sensors is a motion sensor with a timer. If the motion sensor does not detect the movement of an occupant for a designated period of time, the controller 42 will turn off the targeting sensors and the fan or fans.

The device settings can also be changed depending on the desires of the targeted occupant of a space in one embodiment. An RFID tag worn or carried by an occupant can be read by a sensor. The instructions from the RFID tag can be interpreted by the controller 42 and the fan speed, for example, can be adjusted higher or lower by the controller. In this embodiment, the environment and fan output can be individually tailored to an occupant or space automatically by the instructions provided by RFID tags and sensors.

Figure 3:
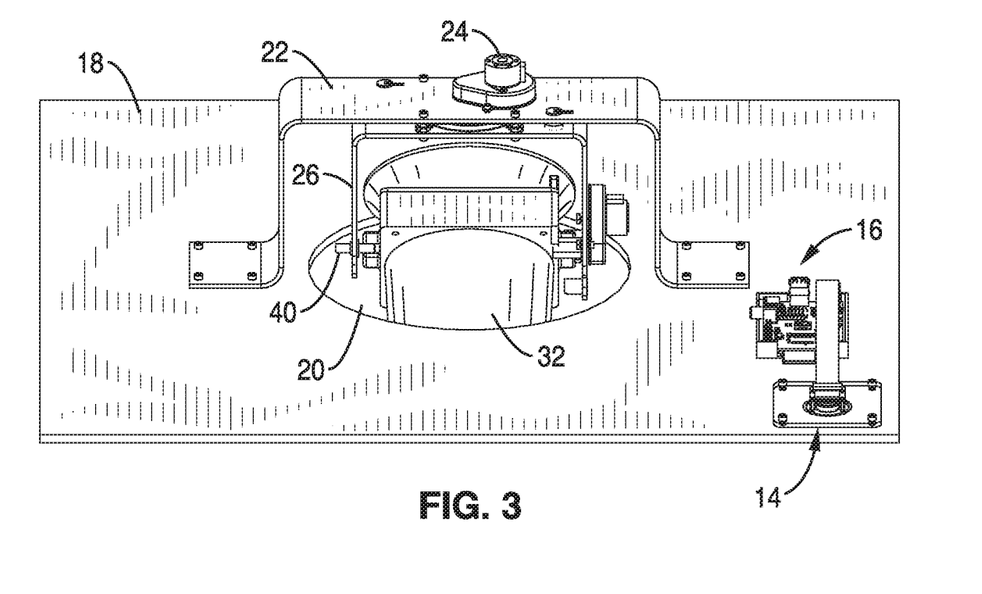
FIG. 3 is a front perspective view of the apparatus showing the nozzle and tracking elements.

Base 18 is sized and configured to fit in a conventional suspended ceiling and can be easily installed or moved from point to point in an existing ceiling grid. The intake of the fan 36 and fan nozzle 32 are above the plane of the base 18 and in the space between the suspended ceiling and the ceiling or roof structure of the building in this embodiment. As seen in FIG. 3 and FIG. 4, the mounted anchor bracket 22 has a low profile and the apparatus occupies a fairly small volume that does not interfere with ceiling structures. Intake air to the fan 36 is drawn from the ceiling interior and through opening 20 of base 18 through the flared intake end 28 of the fan nozzle 32. This provides a circulation of air from the room and ceiling through the fans. In one embodiment, some air from air cooling or heating units of the building that has been ducted to the room from the source can be directed to the intake 28 of the fan nozzle for rapid distribution. For example, unoccupied rooms may be at uncomfortable temperatures when new occupants arrive because heating or cooling assets are directed to other building areas of need. Rather than send a large movement of treated air to the room to cool the room, treated air can be included in the air directed to rapidly cool or heat the individuals to their preferred conditions.

Figure 5:
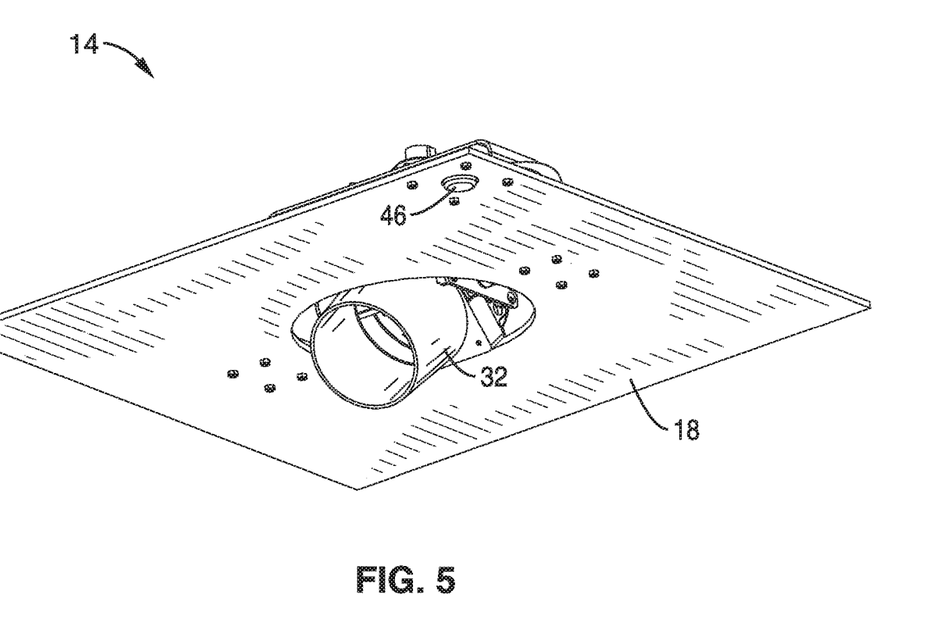
FIG. 5 is a bottom perspective view of the apparatus of FIG. 1.

As seen in FIG. 5, a nozzle within a ceiling tile sized base 18 is unobtrusive, easily fitting into the architectural norms for commercial interiors. Unlike conventional fans, the base 18 can be relocated as easily as an acoustical tile to many locations in the ceiling grid. The sensor system 14 and control system 16 are capable of monitoring occupancy, the environment and thermal and human targets as well as communicating with occupants and with the central HVAC system.

However, the ceiling tile adaptation is only one illustration of the apparatus. FIG. 6 and FIG. 7 show embodiments of the apparatus that is freely suspended from a ceiling that is independent and not mounted in the plane of the ceiling. For example, in FIG. 6, the anchor bracket of the blower system is secured from above with a suspension bracket 48 that is coupled to the anchor bracket 22. Similarly, the blower head can be anchored with wire cables or chains 50 shown in FIG. 7.

In the embodiment shown in FIG. 7, the wire supports preferably flare outwardly so that the unit does not swing or twist in response to rotational acceleration of the nozzle bracket 26 or nozzle 32. In one embodiment, the suspension 50 is like an inverted tripod of wires or it may have a suspension of four wires. The power for the unit is disposed down along one of the wires from the ceiling.

The gimbal mechanism can also be positioned above or below the suspension wires. In FIG. 7, the inverted tripod of wire or chain supports 50 is static relative to the building. In the embodiment where the gimbal is positioned above, the wires can move by reeling one or more wires in or out to rotate the tripod and the blower head.

An optional exterior housing 52 can be incorporated in or coupled to the anchor bracket 22 to provide a pleasing exterior for the apparatus. In FIG. 6 and FIG. 7, the housing 52 is cut away to show the interior and blower device. The sensors 14 and controller 16 can be mounted to the housing 52, anchor bracket 26 or at remote locations. The top of the housing element 52 is also open so that air can be supplied to the fan.

The suspension bracket 48 can also be tubular and capable of retaining power lines or communications lines if the blower units are wired to each other or to an optional central controller. The blower units can act autonomously or in a coordinated fashion where ultimate control over each blower unit is in a building blower system control that provides building wide control over the heating and cooling systems as well as the individual blower units.

Accordingly, the ceiling mounted air jet system ensures occupant comfort while saving HVAC energy during summer and winter conditions when in use. During cooling periods, a light breeze from the blower nozzle cools the occupant. During heating periods, the system mixes the air in the workspace to prevent undesirable thermal stratification.

Typical use of a single tracking fan can be illustrated with a cubicle or office. An occupant in a workstation below the apparatus is detected by a sensor array such as a camera or a MEMS-based ultrasonic 3D rangefinder on the panel's bottom surface. The rangefinder sensors measure both direction and distance to the occupant, so the nozzle can aim and provide a steady stream of air onto the head and upper body of the occupant, even as they move throughout the room. The array also allows the occupant to reset fan speed with simple hand gestures. A controller with an embedded wireless microprocessor provides and environmental sensing and rich control options, including occupant control via internet application, gesture sensing or RFID tag.

In the building air cooling season, the directed air streams from the nozzle are calculated to be preferably turbulence-free, fast-acting, and extremely energy-efficient. Unlike regular fans which provide air movement over a small area, the occupant-tracking system of the apparatus ensures that moving air reaches the occupant continuously even if the occupant is moving.

The aiming response is configured so that the occupant cannot tell that the cooling they feel is not happening throughout the entire workstation. It has been shown that 5 W of fan power input provides 23 W of body cooling with $COP_{cooling}=4.6$. This enables a 4° F. rise in the room temperature for the same comfort. A one-degree Fahrenheit increase in indoor temperature in the summer months reduces a building's total annual HVAC energy by about 5% and a 20% HVAC energy savings is very significant while providing equal or better comfort to the occupants.

The apparatus may also be used in conjunction with modern radiant cooled ceiling strategies, improving their thermal performance by efficiently projecting cooled air from the ceiling to the occupants. It can also be attached to dedicated cooling devices.

In the building air heating season, the apparatus can be used to reduce or eliminate the undesirable floor-to-ceiling temperature stratification that often comes from energy-efficient operation of air systems for heating. By replacing cold air around the sensitive feet with warmer air, for example, the apparatus allows the overall room temperature to be lowered. In this case, the ultrasonic detection aims the fan at the floor whenever occupants are not nearby, in order to displace cold air at floor level with warm air from the ceiling level. The controller senses the difference between floor surface temperature and ceiling panel temperature, and automatically activates the fan to reduce the difference. Again this feature can be adjusted or overridden by the occupant below. Distributed one per workstation, the system is an order of magnitude more energy efficient than using central air handlers for destratification. In this case, 5 W of input energy provides the 18 W of heating of the target for a $COP_{heating}\sim3.6$.

It can be seen that the interactive occupant fan units can be incorporated into a system that controls the environment of a zone or entire building while reducing the overall energy that is required to produce temperature treated air and tuned to the comfort designations of individual occupants. In the embodiment shown in FIG. 8, the system 60 has three occupant tracking fan units 62, 64, 66 and a central controller 68. Although three tracking fan units are used to illustrate the system in FIG. 8, any number of fan units can be used. The tracking fan units 62, 64, 66 are operably interconnected to the central controller 68 by wireless or wired communications. The tracking fan units 62, 64, 66 are normally similarly configured and each have sensors and a blower control with a controller for fan speed, targeting and nozzle direction control etc.

Figure 8:
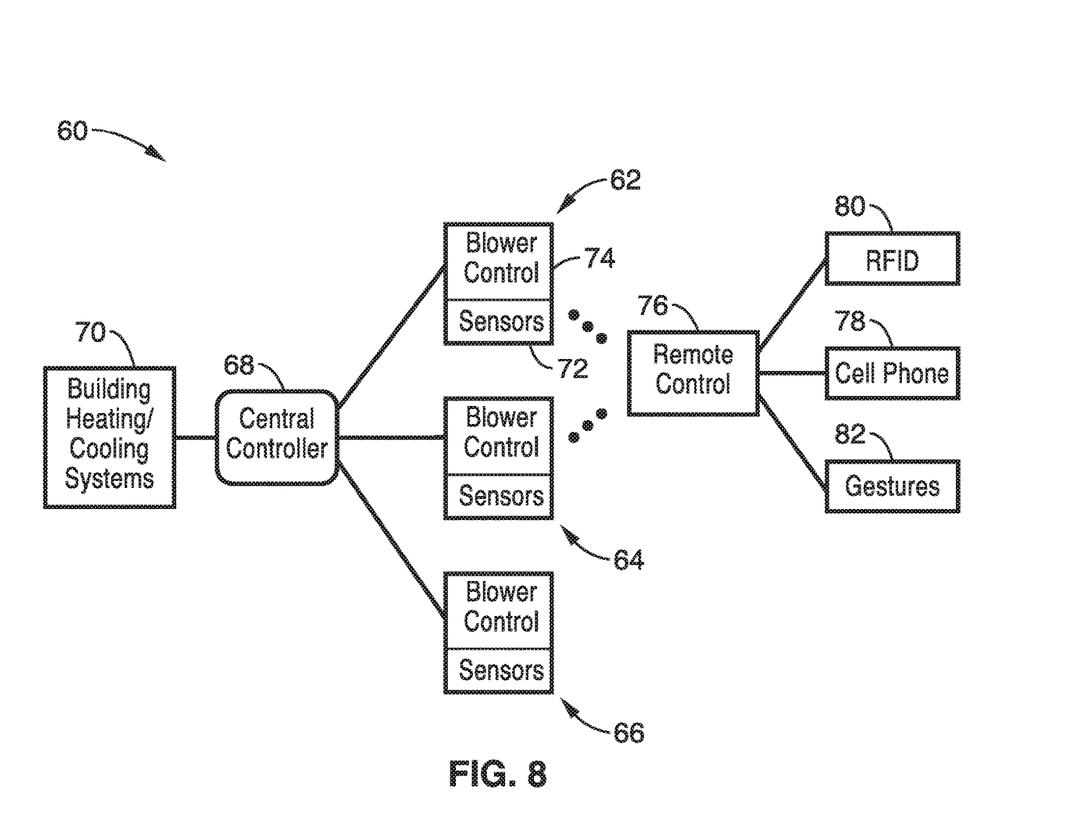
FIG. 8 is a schematic of one embodiment of a system of multiple blower units and a central controller.

The central controller 68 is similarly connected to the building heating and cooling systems 70. The building heating and cooling systems 70 preferably include blowers and ducts with dampers that can direct air from the source of treated air to different locations or zones within the building. The central controller 68 not only controls the actuation of the heating or cooling air sources, but it also directs temperature treated air to locations of need as determined by the sensors and blower control of each occupant tracking fan unit 62, 64, 66.

Conventional building heating and cooling systems 70 normally have temperature and airflow sensors in the network of ducts and a thermostat temperature sensor within the room or zone. Some air treatment systems 70 have network outlets with variable air volume (VAV) terminal units and one VAV unit usually serves one zone. The VAV units may also be fan-powered or passive, and may also contain reheating elements.

As illustrated in FIG. 8, the system of fan tracking units and sensors are integrated with heating and cooling systems 70 of the building and local environments can be controlled by the central controller 68. The occupant tracking fan system adds new sensors to the overall environmental control system including monitoring workstation-level occupancy, occupant heating/cooling preferences and workstation level temperatures. This information can be collected by a local system and wirelessly transmitted to the central control system 68 via the Internet, for example, to tune the individual VAV units to make more occupant-specific comfort levels, or to save energy.

Alternatively, in another embodiment, the occupant-tracking fan sensors (camera, temperature, IR) and controller can communicate directly with the VAV terminal units that serve the same building zone or room to control the output.

The addition of the sensors and tracking fans allows a coordinated response to local conditioning demands through local conditioning mechanisms rather than a general response to local conditioning needs.

The tracking fan units 62, 64, 66 in the system 60 preferably have both targeting sensors and environmental monitoring sensors. For example, the sensors 72 of the tracking fan 62 apparatus have one or an array of targeting sensors such as a camera, an infrared camera and an ultrasonic rangefinder. Sensors 72 also preferably include an environmental condition sensor such as a humidity sensor, a temperature sensor, an RFID sensor or a motion sensor.

The tracking fan controller 74 of the tracking fan 62 preferably processes the data from the sensors 72 and then targets the occupants or space in proximity to the tracking fan with a flow of air. If there is only one tracking fan unit in a room such as in an office, the comfort levels determined by fan speed and air temperature may be set by the usual occupant. The comfort levels can be set with an optional remote control 76 that allows individual control over the blower control 74. The remote control can be a tablet or cell phone 78 that wirelessly communicates with the fan control 76 to allow the designation of individual settings.

In another embodiment, the settings can be designated automatically by an RFID device 80 worn by individual occupants that is read by an RFID sensor 72. If there is more than one occupant with an RFID device in proximity to the blower, the blower control 74 will need to prioritize the settings.

Settings such as fan speed can also be designated by gestures 82 that are interpreted by blower control 74 in another embodiment. For example, the camera or ultrasonic rangefinder sensors can register a particular hand movement to increase or decrease the fan speed. Accordingly, when new individuals enter an unoccupied room, the blower and temperature settings can be adjusted through instructions from an RFID tag, a tablet or phone interface or by gestures recognized by the fan sensors and fan controller.

The sensor data and the fan speed data of each of the tracking fan controls and sensors can also be monitored by the central controller 68.

The data from the blower temperature and fan speed sensors as well as occupant designated settings can also be used by the central controller 68 to adjust the timing and duration of the actuations of the heating or cooling sources so that the overall environmental temperatures in the building or zones is determined by individual comfort rather than air temperature. Areas of the building with high usage and identified need can have heating or cooling assets directed to those locations from areas of lesser need. Furthermore, the overall ambient temperature of a room or zone may be higher or lower than would be needed without the system to provide the same occupant comfort level. This will save energy costs because of reduced air treatment needs.

From the description herein, it will be appreciated that the present disclosure encompasses multiple embodiments which include, but are not limited to, the following:

1. An occupant-tracking fan apparatus, comprising: (a) at least one source of forced air; (b) a movable support configured for multi-axis positioning of the forced air source; and (c) a controller with a sensor configured for controlling the moveable support to direct forced air toward a target detected by the sensor.

2. The apparatus of any preceding embodiment, wherein the source of forced air comprises a fan and a directional nozzle with an intake and an output, wherein air from the fan is emitted from the nozzle towards the target.

3. The apparatus of any preceding embodiment, wherein the directional nozzle further comprises an air filter.

4. The apparatus of any preceding embodiment, further comprising a suspension mount coupled to the moveable support, wherein the moveable support is secured to a building ceiling above room occupants by the suspension mount.

5. The apparatus of any preceding embodiment, further comprising a planar base sized to be incorporated in a suspended ceiling grid, the moveable support mounted to the planar base, wherein the moveable support and air source are positioned above room occupants.

6. The apparatus of any preceding embodiment, wherein the moveable support comprises: (a) an anchor bracket; (b) a fan bracket axially coupled to the anchor bracket and to the source of forced air; and (c) means for axial rotation of the fan bracket and the source of forced air; (d) wherein the fan bracket is configured to rotate about a vertical axis; and (e) wherein the source of forced air axially coupled to the fan bracket is configured to rotate about a horizontal axis.

7. The apparatus of any preceding embodiment, wherein the sensor comprises one or an array of sensors selected from the group of sensors consisting of a camera, an infrared camera and an ultrasonic rangefinder.

8. The apparatus of any preceding embodiment, wherein the controller comprises: (a) a computer processor operably coupled to the movable support and to the sensors; and (b) programming in a non-transitory computer readable medium and executable on the computer processor for performing steps comprising: (i) acquiring sensor data from the sensors; (ii) analyzing acquired sensor data to identify targets and target locations; and (iii) controlling the moveable support to direct an air stream to an identified target.

9. The apparatus of any preceding embodiment, wherein the programming further performs the step comprising controlling the settings of heating or cooling systems of a building.

10. The apparatus of any preceding embodiment, wherein the controller further comprises a remote control interface, and wherein actuation and settings of the apparatus can be controlled remotely.

11. The apparatus of any preceding embodiment, wherein the remote control comprises a radio frequency identification tag and sensor, and wherein air source actuation and settings of the apparatus can be controlled automatically.

12. The apparatus of any preceding embodiment, wherein the remote control comprises gesture recognition sensors and programming, and wherein actuation and settings of the apparatus can be controlled remotely by designated gestures of an occupant.

13. The apparatus of any preceding embodiment, wherein the remote control comprises a central controller.

14. A target-tracking fan apparatus, comprising: (a) at least one air source having a fan and a fan nozzle with an output; (b) a fan bracket and nozzle motor axially coupled to the fan nozzle, the nozzle configured to rotate about a horizontal axis upon actuation of the nozzle motor; (c) an anchor bracket and fan bracket motor axially coupled to the fan bracket, the fan bracket configured to rotate about a vertical axis upon actuation of the fan bracket motor; and (d) a controller with at least one sensor electrically coupled to the nozzle motor and the fan bracket motor, configured for controlling the actuation of the nozzle motor and the fan bracket motor to direct forced air from the fan nozzle output toward a target detected by the sensors.

15. The apparatus of any preceding embodiment, wherein the controller comprises: (a) a computer processor operably coupled to the fan, nozzle motor, fan bracket motor and sensors; and (b) programming in a non-transitory computer readable medium and executable on the computer processor for performing steps comprising: (i) acquiring sensor data from the sensors; (ii) analyzing acquired sensor data to identify targets and target locations; (iii) controlling the nozzle motor and fan bracket motor to direct an air stream to an identified target; and (iv) controlling the fan speed.

16. The apparatus of any preceding embodiment, wherein the sensor comprises one or an array of sensors selected from the group of sensors consisting of a camera, an infrared camera and an ultrasonic rangefinder.

17. The apparatus of any preceding embodiment, further comprising at least one sensor selected from the group of sensors consisting of an RFID sensor, a motion sensor, a humidity sensor and a temperature sensor.

18. A system of target-tracking fans, comprising: (a) a plurality of air sources, comprising: (i) at least one fan and a fan nozzle with an output; (ii) a fan bracket and nozzle motor axially coupled to the fan nozzle, the nozzle configured to rotate about a horizontal axis upon actuation of the nozzle motor; (iii) an anchor bracket and fan bracket motor axially coupled to the fan bracket, the fan bracket configured to rotate about a vertical axis upon actuation of the fan bracket motor; (iv) a controller with at least one sensor electrically coupled to the nozzle motor and the fan bracket motor, configured for controlling the actuation of the nozzle motor and the fan bracket motor to direct forced air from the fan nozzle output toward a target detected by the sensors; and (b) a central controller operably coupled to each fan controller and to heating or cooling systems of a building.

19. The system of any preceding embodiment, wherein the fan controller further comprises a remote control interface selected from the group of cellular telephone, tablet, RFID tag, and controller recognized occupant gestures, wherein actuation and settings of each fan apparatus can be controlled remotely.

20. The system of any preceding embodiment, wherein the central controller comprises: (a) a computer processor operably coupled to one or more fan controllers and the heating or cooling systems of a building; and (b) programming in a non-transitory computer readable medium and executable on the computer processor for performing steps comprising: (i) acquiring temperature sensor and fan speed data from the sensors of each fan controller; and (ii) controlling the settings of the heating or cooling systems of the building to regulate the amount of temperature treated air to locations in a building.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

It will be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An occupant-tracking fan apparatus, comprising:
   (a) at least one source of forced air comprising a fan and a directional nozzle with an intake and an output, wherein air from the fan is emitted from the nozzle towards a target;
   (b) a movable support configured for powered multi-axis positioning of the each forced air source, the moveable support comprising:
      (i) an anchor bracket with a fan bracket motor;
      (ii) a fan bracket axially coupled to the anchor bracket and to the fan bracket motor said fan bracket configured to rotate about a vertical axis with actuation of the fan bracket motor; and
      (iii) a nozzle motor axially coupled to the fan bracket and to the directional nozzle is configured to rotate the nozzle about a horizontal axis upon actuation;
   (c) a planar base sized to be incorporated in a suspended ceiling grid, said moveable support mounted to the planar base, wherein said moveable support and at least one source of forced air are positioned above room occupants; and (d) a controller with one or more sensors configured for controlling each motor of the moveable support to direct forced air toward a target detected by the sensor.

2. An apparatus as recited in claim 1, wherein said directional nozzle further comprises an air filter.

3. An apparatus as recited in claim 1, wherein said one or more sensors comprises one or an array of sensors selected from the group of sensors consisting of a camera, an infrared camera and an ultrasonic rangefinder.

4. An apparatus as recited in claim 1, wherein said controller comprises:
   (a) a computer processor operably coupled to the movable support motors and to the one or more sensors; and
   (b) programming in a non-transitory computer readable medium and executable on the computer processor for performing steps comprising:
      (i) acquiring sensor data from the sensors;
      (ii) analyzing acquired sensor data to identify targets and target locations; and
      (iii) controlling the moveable support to direct an air stream to an identified target.

5. An apparatus as recited in claim 4, wherein said programming further performs the step comprising controlling the settings of heating or cooling systems of a building.

6. An apparatus as recited in claim 1, wherein said controller further comprises a remote control, and wherein actuation and settings of the apparatus can be controlled remotely.

7. An apparatus as recited in claim 6, wherein said remote control comprises a radio frequency identification tag and sensor, and wherein air source actuation and settings of the apparatus can be controlled automatically.

8. An apparatus as recited in claim 6, wherein said remote control comprises gesture recognition sensors and programming, and wherein actuation and settings of the apparatus can be controlled remotely by designated gestures of an occupant.

9. An apparatus as recited in claim 6, wherein said remote control further comprises an interface with a central controller.

10. A target-tracking fan apparatus, comprising:
    (a) an air source having a fan and a fan nozzle with an output;
    (b) a fan bracket and nozzle motor axially coupled to the fan nozzle, the nozzle configured to rotate about a horizontal axis upon actuation of the nozzle motor;
    (c) an anchor bracket and fan bracket motor axially coupled to the fan bracket, the fan bracket configured to rotate about a vertical axis upon actuation of the fan bracket motor;
    (d) a suspension mount coupled to the moveable support, wherein said moveable support is secured to a building ceiling above room occupants by the suspension mount; and
    (e) a controller with at least one occupant sensor electrically coupled to the nozzle motor and the fan bracket motor, configured for controlling the actuation of the nozzle motor and the fan bracket motor to direct forced air from the fan nozzle output toward a target occupant detected by the sensors.

11. An apparatus as recited in claim 10, wherein said controller comprises:
    (a) a computer processor operably coupled to the fan, nozzle motor, fan bracket motor and sensors; and
    (b) programming in a non-transitory computer readable medium and executable on the computer processor for performing steps comprising:
       (i) acquiring sensor data from each of the sensors;
       (ii) analyzing acquired sensor data to identify targets and target locations;
       (iii) controlling the nozzle motor and fan bracket motor to direct an air stream to an identified target; and
       (iv) controlling the fan speed.

12. An apparatus as recited in claim 10, wherein said occupant sensor comprises one or an array of sensors selected from the group of sensors consisting of a camera, an infrared camera and an ultrasonic rangefinder.

13. An apparatus as recited in claim 12, further comprising at least one sensor selected from the group of sensors consisting of an RFID sensor, a motion sensor, a humidity sensor and a temperature sensor.

14. A system of target-tracking fans, comprising:
    (a) a plurality of air sources, comprising:
       (i) a fan and a fan nozzle with an output;
       (ii) a fan bracket and nozzle motor axially coupled to the fan nozzle, the fan nozzle configured to rotate about a horizontal axis upon actuation of the nozzle motor;
       (iii) an anchor bracket with a fan bracket motor axially coupled to the fan bracket, the fan bracket configured to rotate about a vertical axis upon actuation of the fan bracket motor; and
       (iv) a fan nozzle controller with at least one sensor electrically coupled to the fan, the nozzle motor and the fan bracket motor, configured for controlling the actuation of the nozzle motor and the fan bracket motor to direct forced air from the fan nozzle output toward a target detected by the sensors; and
    (b) a central controller operably coupled to each fan controller and to heating or cooling systems of a building.

15. A system as recited in claim 14, wherein said fan controller further comprises a remote control selected from the group of cellular telephone, tablet, RFID tag, and controller recognized occupant gestures, wherein actuation and settings of each fan apparatus can be controlled remotely.

16. A system as recited in claim 14, wherein said central controller comprises:
    (a) a computer processor operably coupled to one or more fan controllers and the heating or cooling systems of a building; and
    (b) programming in a non-transitory computer readable medium and executable on the computer processor for performing steps comprising:
       (i) acquiring temperature sensor and fan speed data from the sensors of each fan controller; and
       (ii) controlling the settings of the heating or cooling systems of the building to regulate the amount of temperature treated air to locations in a building.

17. An occupant-tracking fan apparatus, comprising:
    (a) at least one source of forced air;
    (b) a movable support configured for powered multi-axis positioning of each forced air source;
    (c) a controller with a sensor configured for controlling the moveable support to direct forced air toward a target detected by the sensor; and
    (d) a remote control operably coupled to the controller, said remote control comprising gesture recognition sensors and programming, wherein actuation and settings of the apparatus can be controlled remotely by designated gestures of an occupant.

18. A system of target-tracking fans, comprising:
    (a) a plurality of air sources, comprising:
       (i) a fan and a fan nozzle with an output;

(ii) a fan bracket and nozzle motor axially coupled to the fan nozzle, the nozzle configured to rotate about a horizontal axis upon actuation of the nozzle motor;

(iii) an anchor bracket and fan bracket motor axially coupled to the fan bracket, the fan bracket configured to rotate about a vertical axis upon actuation of the fan bracket motor; and (iv) a fan controller with at least one sensor electrically coupled to the nozzle motor and the fan bracket motor, configured for controlling the actuation of the nozzle motor and the fan bracket motor to direct forced air from the fan nozzle output toward a target detected by the sensors;

(b) a central controller operably coupled to each fan controller and to heating or cooling systems of a building; and (c) a remote controller selected from the group of controllers consisting of a cellular telephone, a tablet, an RFID tag, and controller recognized occupant gestures, wherein actuation and settings of each fan apparatus and heating or cooling systems of a building can be controlled remotely.

* * * * *